(12) United States Patent
Tooman et al.

(10) Patent No.: US 9,381,691 B2
(45) Date of Patent: Jul. 5, 2016

(54) PRESSURE RESISTANT DROP TIP NOZZLE FOR INJECTION MOLDING

(71) Applicant: Plastic Engineering & Technical Services, Inc., Auburn Hills, MI (US)

(72) Inventors: Patrick A. Tooman, Clarkston, MI (US); Bruce Casey, White Lake, MI (US)

(73) Assignee: Plastic Engineering & Technical Services, Inc., Auburn Hills, MI (US)

( * ) Notice: Subject to any disclaimer, the term of this patent is extended or adjusted under 35 U.S.C. 154(b) by 20 days.

(21) Appl. No.: 14/314,607

(22) Filed: Jun. 25, 2014

(65) Prior Publication Data

US 2014/0374504 A1    Dec. 25, 2014

Related U.S. Application Data

(60) Provisional application No. 61/839,171, filed on Jun. 25, 2013.

(51) Int. Cl.
  *B05B 1/24*  (2006.01)
  *B29C 45/27* (2006.01)
  *B23P 15/00* (2006.01)

(52) U.S. Cl.
  CPC .............. *B29C 45/27* (2013.01); *B23P 15/007* (2013.01); *B29C 2045/2782* (2013.01)

(58) Field of Classification Search
  CPC .... B29C 45/20; B29C 45/74; B29C 45/2727; B29C 2045/1883
  USPC .................................. 239/128, 133, 134, 132
  See application file for complete search history.

(56) References Cited

U.S. PATENT DOCUMENTS

| | | | |
|---|---|---|---|
| 4,173,448 A | 11/1979 | Rees et al. | |
| 4,666,396 A | 5/1987 | Shaw | |
| 4,810,184 A | 3/1989 | Gellert et al. | |
| 4,861,256 A * | 8/1989 | Covey ............... | B05C 17/00543 29/402.18 |
| 4,964,795 A | 10/1990 | Tooman | |
| 5,067,893 A | 11/1991 | Osuna-Diaz | |
| 5,098,274 A | 3/1992 | Krishnakumar et al. | |
| 5,353,673 A | 10/1994 | Lynch | |
| 5,378,138 A | 1/1995 | Onuma et al. | |
| 5,470,219 A | 11/1995 | Yokoyama et al. | |
| 5,491,372 A | 2/1996 | Erhart | |
| 5,557,154 A | 9/1996 | Erhart | |
| 5,783,234 A | 7/1998 | Teng | |
| 5,820,803 A | 10/1998 | Hashimoto | |
| 5,834,041 A | 11/1998 | Sekine et al. | |
| 5,840,231 A | 11/1998 | Teng | |
| 5,879,727 A | 3/1999 | Puri | |
| 5,919,492 A | 7/1999 | Tarr et al. | |

(Continued)

*Primary Examiner* — Davis Hwu
(74) *Attorney, Agent, or Firm* — Warn Partners, P.C.

(57) ABSTRACT

A pressure resistant drop tip nozzle assembly for an injection molding machine having a nozzle body with a nozzle passage extending axially through said nozzle body between a nozzle inlet and a nozzle outlet. The assembly includes a drop tip which has a body connected to the nozzle outlet of said nozzle body. The drop tip has a drop tip bore extending between a drop inlet located adjacent said nozzle outlet body and a drop outlet. A tapered drop passage located at said drop outlet defines a resin flow aperture where resin leaves said drop tip. An internal heating insert is positioned within said drop tip bore. The drop tip body is connected to the nozzle body via a mechanical connection such as screw threads. A reinforcing weld preferably via a continuous laser weld is provided between said drop tip body and said nozzle body.

6 Claims, 4 Drawing Sheets

(56) References Cited

U.S. PATENT DOCUMENTS

| | | |
|---|---|---|
| 5,969,280 A | 10/1999 | Marcinkiewicz |
| 6,086,357 A | 7/2000 | Steil et al. |
| 6,099,767 A | 8/2000 | Tarr et al. |
| 6,129,541 A | 10/2000 | Takeda |
| 6,179,604 B1 | 1/2001 | Takeda |
| 6,294,122 B1 | 9/2001 | Moss et al. |
| 6,294,604 B1 | 9/2001 | Focquet et al. |
| 6,343,925 B1 | 2/2002 | Jenko |
| 6,464,909 B1 | 10/2002 | Kazmer et al. |
| 6,514,440 B1 | 2/2003 | Kazmer et al. |
| 6,638,049 B1 | 10/2003 | Moss et al. |
| 7,329,112 B2 | 2/2008 | Tooman |
| 7,458,804 B2 | 12/2008 | Tooman |
| 8,113,812 B2 * | 2/2012 | Heissler .............. B29C 45/2806 264/328.12 |
| 2002/0102323 A1 | 8/2002 | Ihara et al. |
| 2003/0155672 A1 | 8/2003 | Kazmer et al. |
| 2005/0031728 A1 | 2/2005 | Babin et al. |
| 2005/0225000 A1 * | 10/2005 | Tabassi .................. B29C 45/27 264/40.1 |
| 2006/0263469 A1 * | 11/2006 | Feick .................... B23P 15/007 425/572 |
| 2010/0310706 A1 * | 12/2010 | Gunther ............. B29C 45/1782 425/549 |

* cited by examiner

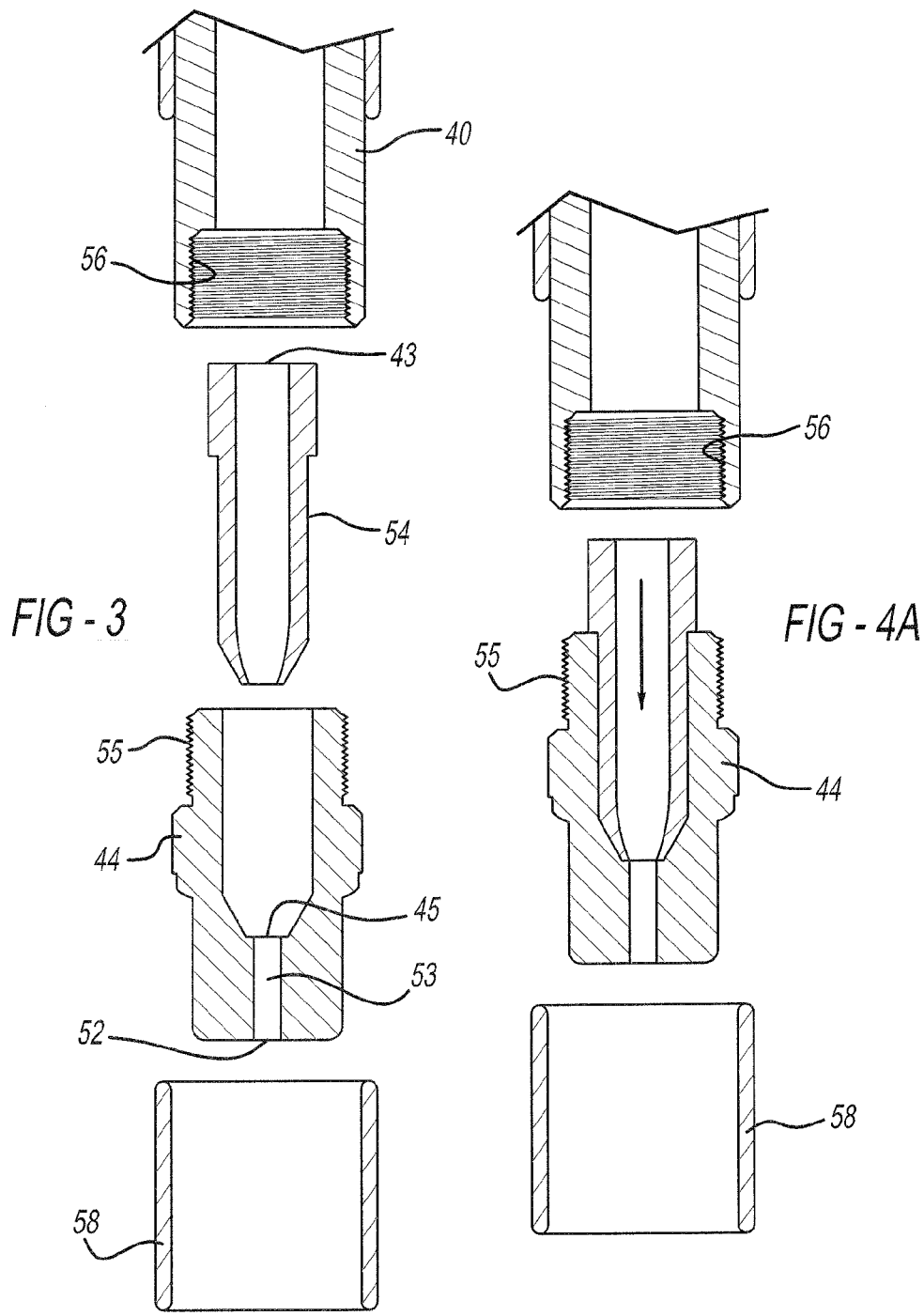

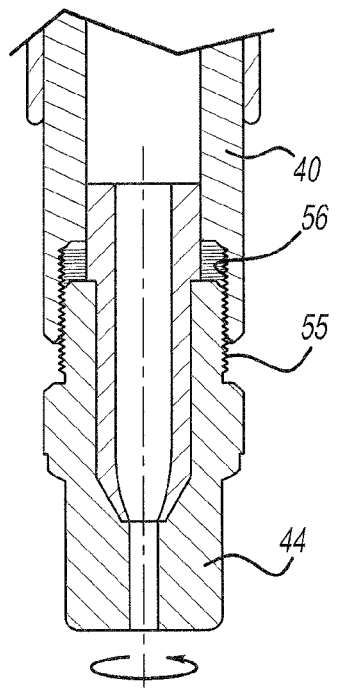
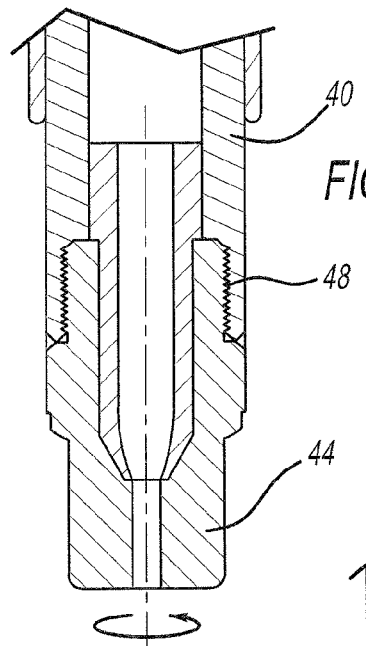
FIG - 4C
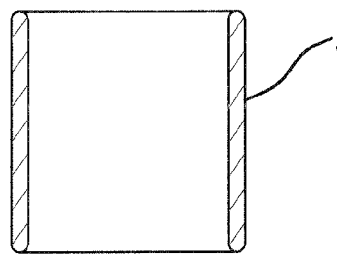
FIG - 4B
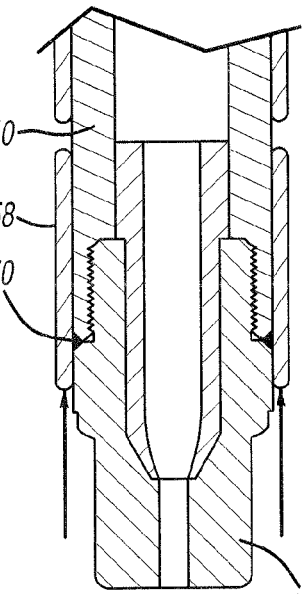
FIG - 4D
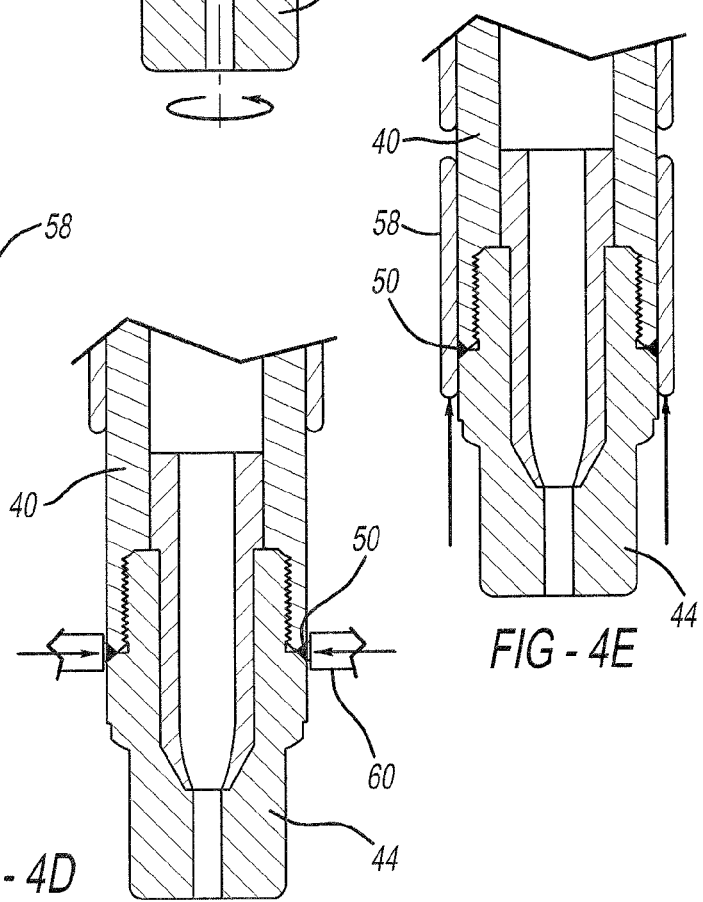
FIG - 4E

PRESSURE RESISTANT DROP TIP NOZZLE FOR INJECTION MOLDING

CROSS-REFERENCE TO RELATED APPLICATIONS

This application claims the benefit of U.S. Provisional Application No. 61/839,171, filed Jun. 25, 2013.

FIELD OF THE INVENTION

The present invention relates to drop tip assembly for an injection molding manifold having an improved pressure resistant design.

BACKGROUND OF THE INVENTION

In the field of injection molding, there are many types of manifold configurations or assemblies. These manifold assemblies are used to maintain the hot molten plastic at a specific temperature throughout the injection of material through the flow path to a mold cavity. The purpose is to ensure that the hot molten plastic material is at a sufficiently high enough temperature when it enters the cavity and does not begin to solidify within the manifold assembly. To this end, the manifold assembly employs one or more nozzle assemblies for introducing to a mold cavity molten resin material. The nozzle assembly receives the molten resin material from a central sprue through a series of passages of a manifold assembly. It is desirable to sufficiently heat the manifold assembly so that the sprue, associated passages, nozzle and nozzle drop tip, which is in direct contact with the mold cavity, will maintain the molten resin at a desired heated temperature.

Typical nozzle assemblies have a nozzle body connected to the sprue and a drop tip nozzle that is connected to the nozzle body. Along the length of the sprue and nozzle assembly, there are a number of heating elements used to input heat to the manifold assembly in order to heat the flow passage for the molten resin. The drop tip nozzle is a separate element that is attached to the nozzle body, usually using a threaded connection. One frequent problem is that mold operators do not wait until the manifold assembly has reached the optimum molding temperature prior to beginning the flow of molten plastic material through the manifold assembly. As a result, some of the molten plastic material will begin to solidify or become more viscous increasing the internal pressure within the flow passages of the manifold assembly to the point that the threaded connection between the drop tip and the nozzle body ruptures and the drop tip will break away from the nozzle body and essentially destroy the nozzle body and drop tip assembly. The present invention provides an improved nozzle and drop tip assembly that is resistant to the greater pressures that are encountered when the manifold assembly has not been heated to the proper operating temperatures.

SUMMARY OF THE INVENTION

A pressure resistant drop tip nozzle assembly for an injection molding machine is provided in the present invention. The nozzle body has a nozzle passage extending axially through said nozzle body between a nozzle inlet and a nozzle outlet. The assembly includes a drop tip which has a body connected to the nozzle outlet of said nozzle body. The drop tip has a drop tip bore extending between a drop inlet located adjacent said nozzle outlet body and a drop outlet. A tapered drop passage located at said drop outlet defines a resin flow aperture where resin leaves said drop tip. An internal heating insert is positioned within said drop tip bore. The drop tip body is connected to the nozzle body via a mechanical connection such as screw threads. A reinforcing weld preferably via a continuous laser weld is provided between said drop tip body and said nozzle body. The weld provides suitable reinforcement for the connection such that it resists failure if for some reason the injection molding operation is started too early and the drop tip is over pressurized the nozzle will not fail and cause expensive and inconvenient down time.

BRIEF DESCRIPTION OF THE DRAWINGS

The present invention will become more fully understood from the detailed description and the accompanying drawings, wherein:

FIG. 3 is a cross-sectional exploded side plan view of the nozzle body and drop tip assembly prior to assembly;

FIG. 4A is a cross-sectional side plan view of the nozzle body and drop tip assembly during the method of assembly according to the present invention;

FIG. 4B is a cross-sectional side plan view of the nozzle body and drop tip assembly during the method of assembly according to the present invention;

FIG. 4C is a cross-sectional side plan view of the nozzle body and drop tip assembly during the method of assembly according to the present invention;

FIG. 4D is a cross-sectional side plan view of the nozzle body and drop tip assembly during the method of assembly according to the present invention; and FIG. 4E is a cross-sectional side plan view of the nozzle body and drop tip assembly during the method of assembly according to the present invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
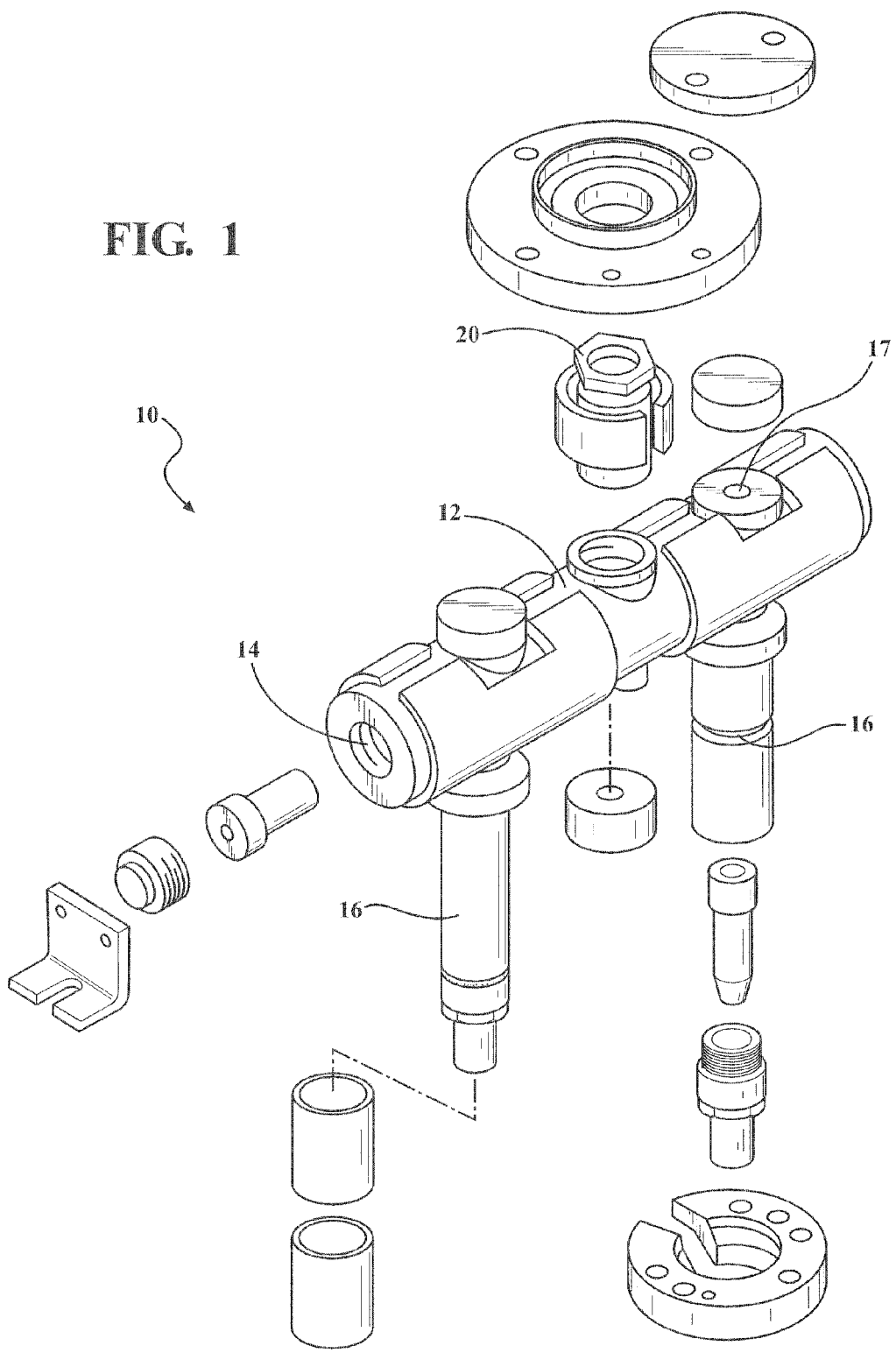
FIG. 1 is a partially exploded perspective view of a manifold in accordance with one embodiment of the present invention.
Figure 2:
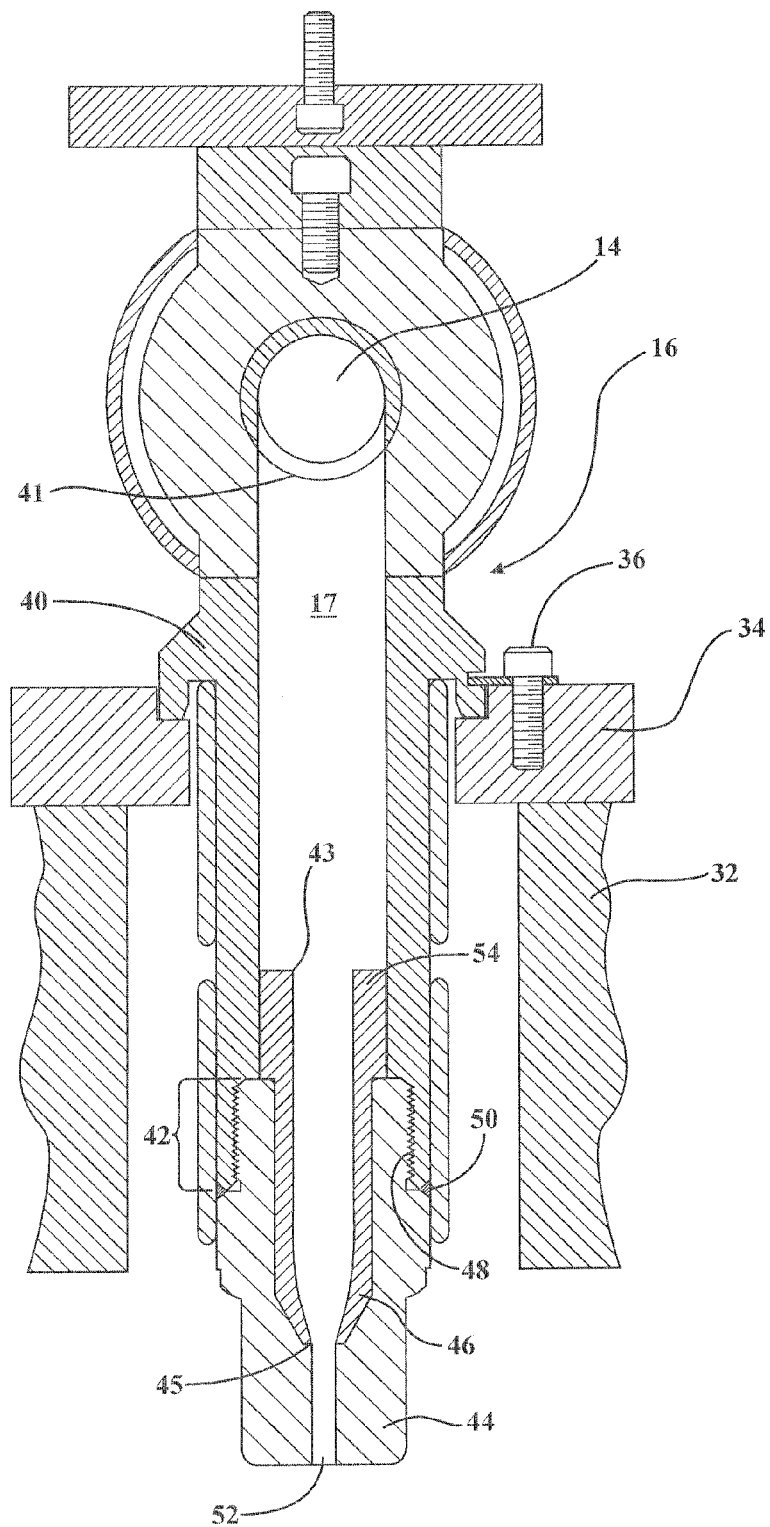
FIG. 2 is a cross-sectional side plan view of the nozzle body and drop tip assembly in accordance with the present invention.

Referring now to FIGS. 1 and 2, a manifold assembly for plastic injection molding is generally shown at 10. The assembly includes an integral or one piece cast cylindrical manifold 12 that includes a central flow passage 14 extending along the manifold including each branch of the manifold 12 and at least one pressure resistant drop tip nozzle assembly 16 extending downwardly from the manifold 12. Each nozzle includes a central nozzle passage 17 extending from the manifold flow passage 14. Each nozzle assembly 16 can have a varying length in order to conform to various mold cavity dimensions, which may be required for a particular molding application.

The manifold 12 is removably secured to support blocks 34 and core 32 by a threaded stud 36 which extends through support blocks 34 and into threaded engagement with both the manifold 12 and the core 32. A sprue 20 extends radially outward from the manifold 12 for facilitating the introduction of plastic injection molding material into the manifold 12.

Referring now to FIG. 2, the pressure resistant drop tip nozzle assembly 16 has a nozzle body 40 with a nozzle passage 17 extending axially through the nozzle body 40 between a nozzle inlet 41 and nozzle outlet 43. A drop tip 44 is connected to the nozzle body 40 with a mechanical connection 48 which in the present embodiment of the invention are mating threads 42 formed on the inside surface of the nozzle body 40. The drop tip 44 has a drop inlet 45 and a drop outlet 52 that the resin flows through the drop outlet 52 and into a mold cavity.

Within the drop tip 44 is an internal heating insert 54 that slides into and nests within the drop tip 44 and has a portion that nests within the nozzle body 40 and in part defines the nozzle outlet 43 of the nozzle passage 17. The internal heating insert 54 is made of heat conductive material that absorbs heat in order to heat the nozzle passage 17 and the passageway defined by the drop tip 44. In addition to the mechanical connection 42 between the drop tip and nozzle body, there is a reinforcing weld 50 positioned between the nozzle body 40 and drop tip 44. The reinforcing weld 50 combined with the mechanical connection 42 further strengthens the pressure resistance of the drop tip nozzle assembly 16 by combining the pressure resistance of the mechanical connection 42 as well as the pressure resistance of the reinforcing weld 50. As a result, the pressure resistant drop tip nozzle assembly 16 is capable of resisting greater pressures that can be encountered when the molten resin flowing through the nozzle passage 17 has not been sufficiently heated prior to beginning an injection molding process.

In a preferred embodiment, the reinforcing weld 50 is accomplished by precision laser welding. Laser welding must be used to provide a precise weld which will not interfere with the rest of the injection molding components. Additionally the weld depth and breadth can be precisely controlled for providing strength to the stainless steel component.

Referring now to FIGS. 3 and 4A-4E a method of assembling a pressure resistant drop tip assembly 16 for an injection molding machine is shown. FIG. 3 shows an exploded view showing the first step of assembling the pressure resistant drop tip assembly, which includes providing the drop tip 44, heating insert 54, nozzle body 40 and a collar 58. The drop tip 44 has drop tip threads 55 formed on an outside surface and configured to mate with nozzle body threads 56 formed on an inner surface of the nozzle body 40. Referring to all of the figures, the method further includes providing the nozzle body 40 having a nozzle passage 17 extending axially through the nozzle body 40 between the nozzle inlet 41 and a nozzle outlet 43. Providing the drop tip 44 with the drop inlet 45, drop outlet 52 and a drop tip bore 53 extending there between and a tapered drop passage located above the drop inlet 45 for defining a resin flow aperture leading to the drop inlet 45.

Referring now to FIGS. 4A-4C the method of assembly further includes the step of connecting the drop tip 44 to the nozzle body 40. The internal heating insert 54 is slid into the drop tip 44 and then the drop tip 44 is connected to the nozzle body 40 by rotating the drop tip 44 so that the drop tip threads 55 engage and mate with the nozzle body threads 56 on said nozzle body 40. Referring to FIG. 4D the drop tip 44 and nozzle body 40 are positioned near a laser welding device 60 at the connection point between the nozzle body 40 and the drop tip 44. Then a step of welding the drop tip 44 to the nozzle body 40 using the laser welding device 60 is carried out to create one or more weld points 50 between the nozzle body 40 and the drop tip 44. The laser welding device 60 is removed and in a final step (shown in FIG. 4E) the collar 58 is slid onto the drop tip 44 and nozzle body 40 to cover the one or more welds 50.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A pressure resistant drop tip nozzle assembly for an injection molding machine comprising:
    a nozzle body having a nozzle passage extending axially through said nozzle body between a nozzle inlet and a nozzle outlet;
    a drop tip having a body connected to said nozzle outlet of said nozzle body and having a drop tip bore extending between a drop inlet located adjacent said nozzle outlet body and a drop outlet;
    an internal heating insert positioned within said drop tip bore;
    a tapered drop passage within said internal heating and located above said drop inlet for defining a resin flow aperture leading to said drop inlet;
    a mechanical connection between said drop tip body and said nozzle body; and
    a reinforcing weld between said drop tip body and said nozzle body.

2. The pressure resistant drop tip nozzle assembly of claim 1 wherein the weld is a continuous weld around the outer periphery of a connection interface between the drop tip body and the nozzle body.

3. The pressure resistant drop tip nozzle assembly of claim 2 wherein said reinforcing weld is provided by precision laser welding.

4. A method of assembling a pressure resistant drop tip assembly for an injection molding machine comprising the steps of:
    providing a nozzle body having a nozzle passage extending axially through said nozzle body between a nozzle inlet and a nozzle outlet, a drop tip having a body and including a drop tip bore extending between a drop inlet and a drop outlet, a tapered drop passage located above the drop inlet for defining a resin flow aperture leading to said drop inlet, drop tip threads formed on the outer surface of the drop tip and nozzle body threads formed on an inner surface of the nozzle body further comprising the steps of:
        connecting the drop tip to the nozzle body by rotating said drop tip so that said drop tip threads located on said drop tip engage and mate with the nozzle body threads located on said nozzle body;
        positioning a laser welding device at the connection point between the nozzle body and the drop tip; and
        welding the drop tip to the nozzle body using the laser welding device and creating one or more weld points between the nozzle body and the drop tip.

5. The method of claim 4 further comprising an internal heating insert positioned within the drop tip bore prior to connecting the drop tip to the nozzle body, wherein the internal heating insert slides into the drop tip.

6. The method of claim 4 wherein the step of welding includes creating a continuous weld around the outer periphery of the connection interface between the drop tip body and the nozzle body.

* * * * *